United States Patent
LeMaster (10) Patent No.: US 8,914,769 B2
(45) Date of Patent: Dec. 16, 2014

(54) SOURCE CODE GENERATION FOR INTEROPERABLE CLIENTS AND SERVER INTERFACES

(75) Inventor: Ronald J LeMaster, Boulder, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 474 days.

(21) Appl. No.: 13/294,914

(22) Filed: Nov. 11, 2011

(65) Prior Publication Data

US 2013/0124604 A1   May 16, 2013

(51) Int. Cl.
*G06F 9/44* (2006.01)
*G06F 9/45* (2006.01)

(52) U.S. Cl.
CPC . *G06F 8/30* (2013.01); *G06F 8/437* (2013.01)
USPC .......................................................... 717/106

(58) Field of Classification Search
CPC ............. G06F 8/30; G06F 8/76; G06F 8/437; G06F 8/443
USPC .......................................................... 717/106
See application file for complete search history.

(56) References Cited

U.S. PATENT DOCUMENTS

| | | | | |
|---|---|---|---|---|
| 5,860,072 | A * | 1/1999 | Schofield | 707/756 |
| 6,066,181 | A * | 5/2000 | DeMaster | 717/148 |
| 6,263,485 | B1 * | 7/2001 | Schofield | 717/114 |
| 6,408,431 | B1 | 6/2002 | Heughebaert et al. | |
| 7,574,456 | B2 | 8/2009 | Krane et al. | |
| 7,603,662 | B2 | 10/2009 | Rajaram et al. | |
| 7,627,853 | B2 * | 12/2009 | Ibert et al. | 717/108 |
| 2001/0013063 | A1 * | 8/2001 | Hall et al. | 709/219 |
| 2003/0208640 | A1 * | 11/2003 | Just | 709/330 |
| 2004/0172637 | A1 | 9/2004 | Koutyrine | |
| 2007/0256058 | A1 | 11/2007 | Marfatia et al. | |
| 2010/0191930 | A1 | 7/2010 | Groff et al. | |
| 2010/0242017 | A1 * | 9/2010 | Stenberg et al. | 717/111 |

OTHER PUBLICATIONS

Berman et al., "IDL Meta Data," IP.com No. IPCOM000123960D, 1999, 2pg.*

* cited by examiner

*Primary Examiner* — Ryan Coyer
(74) *Attorney, Agent, or Firm* — Duft Bornsen & Fetig LLP (57) ABSTRACT

Systems and methods are provided for generating source code to enable communication between a server defined according to a first programming language and a client defined according to a second programming language. The system identifies a server data structure defined according to the first programming language and determines types of the data structure that are not accessible via a runtime conversion library for communications between the server and the client. The system further generates a revised data structure in the first programming language comprising types that are accessible via the runtime conversion library and may be used to manipulate the inaccessible types. The system further generates source code in the second programming language for the client to access the revised data structure via the runtime conversion library, wherein the source code correlates types of the revised data structure to the inaccessible types of the original data structure.

20 Claims, 5 Drawing Sheets

SOURCE CODE GENERATION FOR INTEROPERABLE CLIENTS AND SERVER INTERFACES

FIELD OF THE INVENTION

The invention relates to the field of networked computing, and in particular, to interoperability between clients and servers for networked computing.

BACKGROUND

Servers are used to manage functional computing operations in a variety of settings. In the field of printing, servers may be used to manage the operations of a print shop. For example, a server for a print shop may distribute print jobs, adjust printer settings, administrate user settings and permissions, and perform other duties relevant to the print shop. Unfortunately, servers often utilize internal data structures at runtime that are highly specialized. Client applications that read and write information from the servers often use different data structures than those provided by the servers, and mechanisms to translate between these data structures are used enable the transmission of information between the clients and the servers. These data structures and translation mechanisms may be coded manually, but as large software applications may utilize hundreds of different data structures for server/client communications, a mechanism for automatically generating interoperable source code for clients and servers is desirable. When the programming language used by a client computer is different than that used by the server, it may be particularly hard to generate source code that allows clients to access the server-side data structures. For example, a server-side data structure may include types that do not correspond with the language of the client. A type is a classification that identifies the range of possible values for a variable, the range of operations that may be performed on the variable, and/or the manner in which the variable may be stored. Examples of types include int, string, float, boolean, and others.

To address these issues, servers and clients often utilize one or more conversion libraries at runtime which provide a translation mechanism to convert types for a data structure from one language to another. For example, a conversion library may be used by an Adobe® Flex® application to access internal data structures of a Java application, and the conversion library may further indicate which types (e.g., string) can be readily converted between languages. Unfortunately, these conversion libraries only support standardized data structures and types which are coded according to rigid sets of rules. As servers often use customized data structures that are not compliant with rule sets used for conversion libraries, the conversion libraries may be unable to facilitate access to all of the internal data structures of the server.

SUMMARY

Embodiments described herein generate source code that allows a client application written in a different programming language than the server to manipulate internal data structures of the server via a runtime conversion library. For example, when a data structure of a server includes types that are not compatible with a runtime conversion library, source code is generated to define a revised data structure in the programming language of the server. This revised data structure has types that are compatible with the conversion library. The revised data structure may be implemented at an intermediary (e.g., an interface) in communication with the server, and may further be used to manipulate the original data structure.

Similarly, source code for a client may be generated for accessing the revised data structure. The client source code correlates types of the revised data structure with types of the original data structure. In this manner, the client (through the intermediary) can utilize a runtime conversion library to access and manipulate internal data structures of the server.

One embodiment is a system for generating source code to enable communication between a server defined according to a first programming language and a client defined according to a second programming language. The system is able to identify a server data structure defined according to the first programming language and to determine types of the data structure that are not accessible via a runtime conversion library for communications between the server and the client. The system is further operable to generate a revised data structure in the first programming language comprising types that are accessible via the runtime conversion library and that may be used to manipulate the inaccessible types. The system is further able to generate source code in the second programming language for the client to access the revised data structure via the runtime conversion library. The source code correlates types of the revised data structure to the inaccessible types of the original data structure.

In a further embodiment, the system is able to create types of the revised data structure by recursively analyzing each inaccessible type to identify component types, determining component types supported for use with the conversion library, and including the determined component types at the revised data structure.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
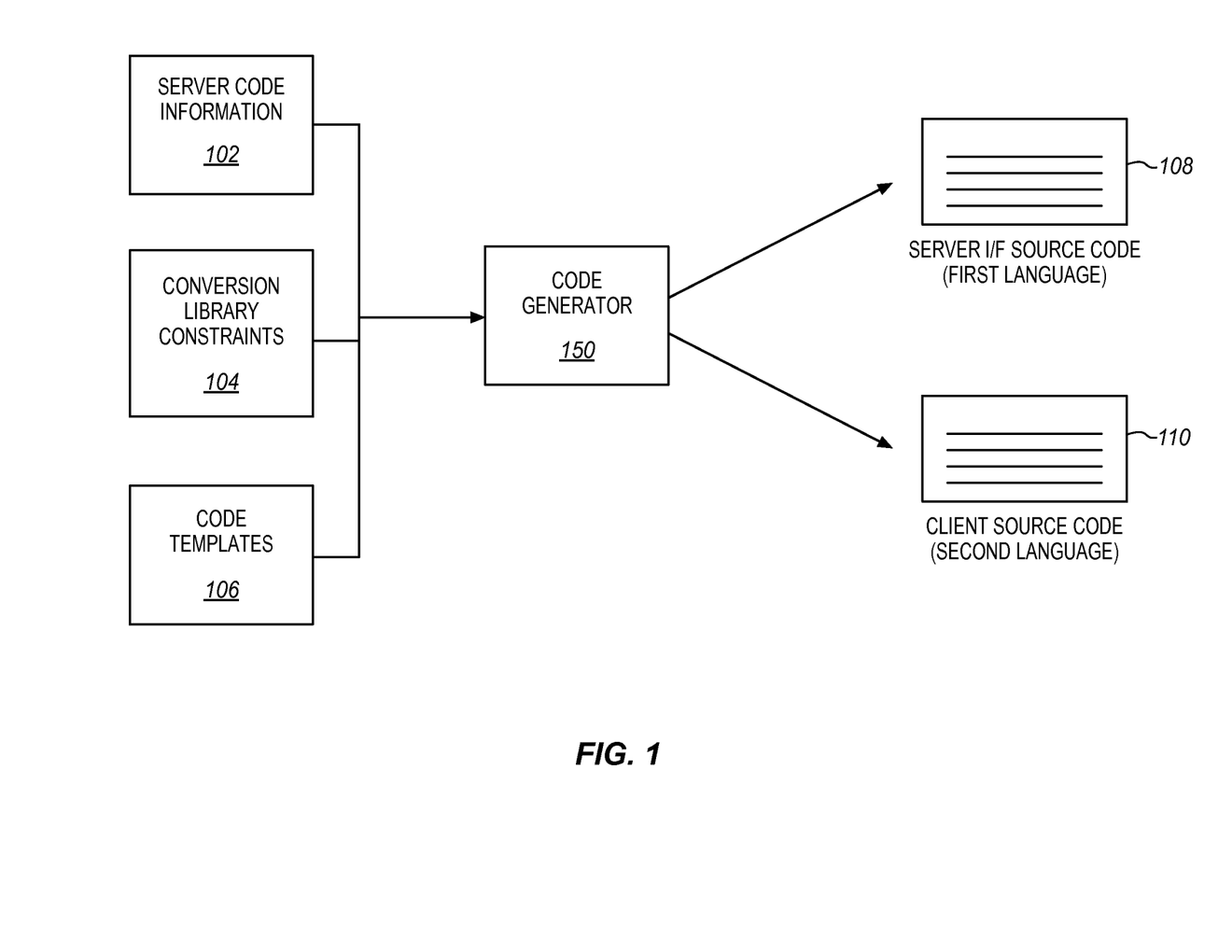
FIG. 1 is a block diagram of a code generator for generating server interface source code and client source code in an exemplary embodiment.

FIG. 1 is a block diagram of a code generator 150 for generating server interface source code and client source code in an exemplary embodiment. Code generator 150 comprises any system, component, or device operable to facilitate the generation of clients as well as server interfaces. In particular, code generator 150 can create interoperable code for both clients and server interfaces that allows for the clients to access and update internal server-side data structures. This in turn provides increased functionality for client-server interactions, as these enhanced clients may be used to direct a wide variety of functions at the server. Code generator 150 may be implemented, for example, as a hardware processor implementing logical instructions.

Code generator 150 may, for example, utilize server code information 102, conversion library constraints 104, and code templates 106 as input. Server information 102 describes the format of internal data structures at a server. For example, server information 102 may describe the names and types of elements used by a data structure of the server. Server information 102 may be acquired from a source code file. In one embodiment, the server is implemented using Java, and server information 102 is acquired from the compiled server code. In other embodiments, the server information 102 may be acquired from server source code, or some other description of the data structures used by the server.

Conversion library constraints 104 describe the nature of types that a runtime conversion library can convert between two different programming languages. For example, constraints 104 may indicate a list of types by name (e.g., integer, float, float32, etc.) that are supported by the conversion library. Constraints 104 may be prepared prior to the activation of code generator 150, or constraints 104 may be generated by code generator 150 as code generator 150 analyzes the conversion library. Code templates 106 may optionally be used by code generator 150 to define a format in which to place generated source code so that the source code may be immediately compiled.

Upon processing the inputs, code generator 150 is operable to generate source code 108 for a server interface. The server interface may communicate with the server in the native language of the server, and therefore may access an internal data structure of the server. Furthermore, the server interface implements a revised data structure that corresponds to the internal data structure. This revised data structure, however, is formatted so that it may be manipulated via a conversion library (i.e., the elements of the revised data structure implement types that are compatible with the conversion library). Code generator 150 is additionally operable to generate corresponding source code 110 for a client operable to communicate with the server interface.

The source codes 108 and 110, when compiled, allow for a client of the server to access and update internal data structures that would otherwise not be available. Specifically, a client may manipulate the revised data structure via the conversion library, and the server interface may then manipulate the internal data structure of the server to reflect the changes to the revised data structure.

Further details of the operation of code generator 150 will be discussed with regard to FIG. 2. Assume, for this embodiment, that code generator 150 receives a request to generate source code for a server interface. Assume further that code generator 150 receives a request to generate source code for a client capable of utilizing the server interface to access internal data structures at the server. Furthermore, it is desired to generate the client source code according to a programming language that was not used to generate the server. For example, the language for the client source code may be specialized for cross-platform applications (e.g., the client may be implemented in a language that allows it to be accessed with a cross-platform Internet browser).

Figure 2:
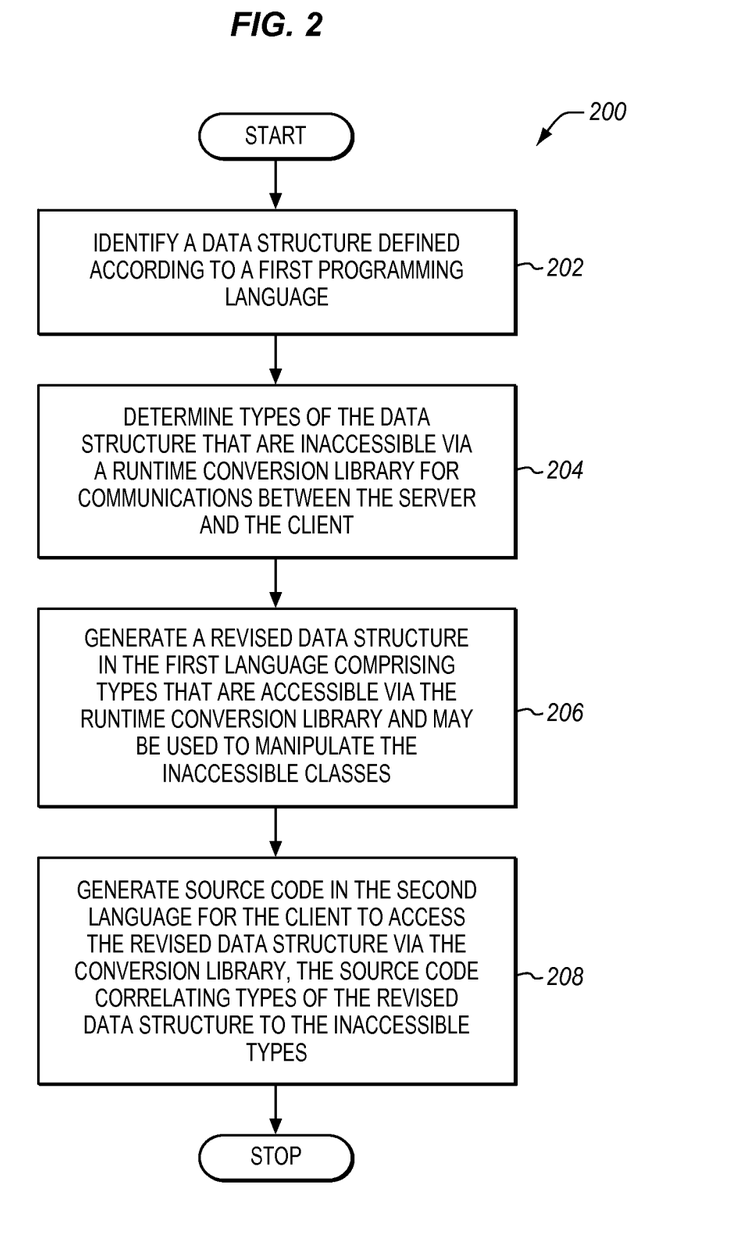
FIG. 2 is a flowchart illustrating a method for facilitating server/client interoperability in an exemplary embodiment.

FIG. 2 is a flowchart illustrating a method for facilitating server/client interoperability in an exemplary embodiment. The steps of method 200 are described with reference to code generator 150 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, code generator 150 identifies a data structure of a server defined according to a first programming language. For example, the received request to generate source code may explicitly identify the data structure. In another example, code generator 150 reviews compiled server code in order to identify internal data structures used to store data. While this is not normally possible according to programming languages such as FORTRAN, C, C++, etc., such functions may be supported if the server is implemented in Java. In another example, code generator 150 identifies a source code file used to compile the server, and analyzes the source code to identify an internal data structure of the server. A data structure comprises a definition or format for storing and organizing digital data so that it may be used efficiently. Data structures include a variety of internal elements, and each element has a type (e.g., an element called "address" may have a type of "string"). In one example, the elements of a data structure define how to store, access, and manipulate data for a print job. For example, the elements of a data structure for a print job may define how to store data indicating the number of copies to print, the user that provided the print job, data to be rasterized and printed, etc. During runtime, one or more objects may be created that implement the data structure. For example, at a print server, an object implementing the print job data structure may be created for each received print job.

In step 204, code generator 150 determines types of the data structure that are inaccessible via a runtime conversion library (i.e., code generator 150 determines which elements of the data structure are implemented as incompatible types). In this application, the term "inaccessible" indicates that the runtime conversion library cannot convert the type from the programming language of the server to a programming language of a client. Code generator 150 may select the conversion library and then analyze it to create constraints 104. Alternatively, code generator 150 may access constraints 104 already stored at a memory. Constraints 104 indicate the types that are supported by the conversion library. In one embodiment, code generator 150 reviews each element of the data structure to see if the element's type matches a type indicated by constraints 104. If there is a match, the element's type is compatible. However, if there is no match, the type is inaccessible.

In step 206, code generator 150 generates a revised data structure defined according to the programming language of the server. The revised data structure includes types that are accessible via the runtime conversion library, and the types of the revised data structure may be used to manipulate the inaccessible types of the original data structure (e.g., classes of the revised data structure may include functions for accessing and/or updating classes of the original data structure). In one embodiment, the types of the revised data structure may be converted at runtime, by code written in the first programming language, to and from those types that are not accessible via the runtime conversion library.

In step 208, code generator 150 generates source code in the second programming language for the client to access the revised data structure via the conversion library. Code templates 106 may be used to generate the source code (and may further include references to libraries, import statements, scoping declarations, return types, etc.). The source code is generated in a programming language distinct from that used for the server (e.g., an Adobe® Flex® or ActionScript 3 programming language), and further correlates the types of the revised data structure to the inaccessible types of the original data structure. The source code may then be stored in a memory or compiled and implemented via a hardware processor. Thus, when a user of the client attempts to manipulate an element of an incompatible type stored at the server, the correlations may be used to determine which elements of the revised data structure should be manipulated. When the revised data structure is manipulated by the client, the server interface alters corresponding portions of the original internal data structure.

Using the method of FIG. 2, a user may beneficially access internal data structures of a server via a client written in a different programming language than the server. Thus, clients for a server can be written in a language that is easy to use across a number of platforms, yet the clients can also provide enhanced functionality for accessing custom internal data structures of the server.

In a further embodiment, code generator 150 creates types for the revised data structure by recursion. For example, code generator 150 may review an inaccessible type of the original data structure to see if it has component types that are supported for use with the conversion library (i.e., if the component types can be converted by the conversion library.). If a component type is supported (e.g., if the component type is a simple string, integer, float, etc.), code generator 150 may implement the component type at an element of the revised data structure. Code generator 150 may further tag the element of the revised data structure with a name, label, or other identifier associating the component type with the original inaccessible type. Alternatively, if the component type is not supported, code generator 150 may recursively search its internal types of the component type for compatibility. This recursive process may continue until all incompatible types correspond to a set of one or more compatible component types. As compatible types are generated for incompatible types in the original server code, the correspondences between the generated and original types are noted.

In a further embodiment, code generator 150 generates source code for a server interface in the same language as that used for the server (e.g., Java). Code templates 106 may help to format the source code. The server interface includes the revised data structure and correlates elements of the revised data structure to the original data structure. Therefore, the server interface may be used to translate from the original data structure to the revised data structure, and vice versa in the language of the server. This in turn allows for manipulation of the original data structure via the revised data structure of the server interface (i.e., when a client requests that the server interface alter the revised data structure, the server interface also alters the underlying original data structure).

EXAMPLES

In the following examples, additional processes, systems, and methods are described in the context of code generated for a print server that manages the operations of a variety of printers at a print shop.

Figure 3:
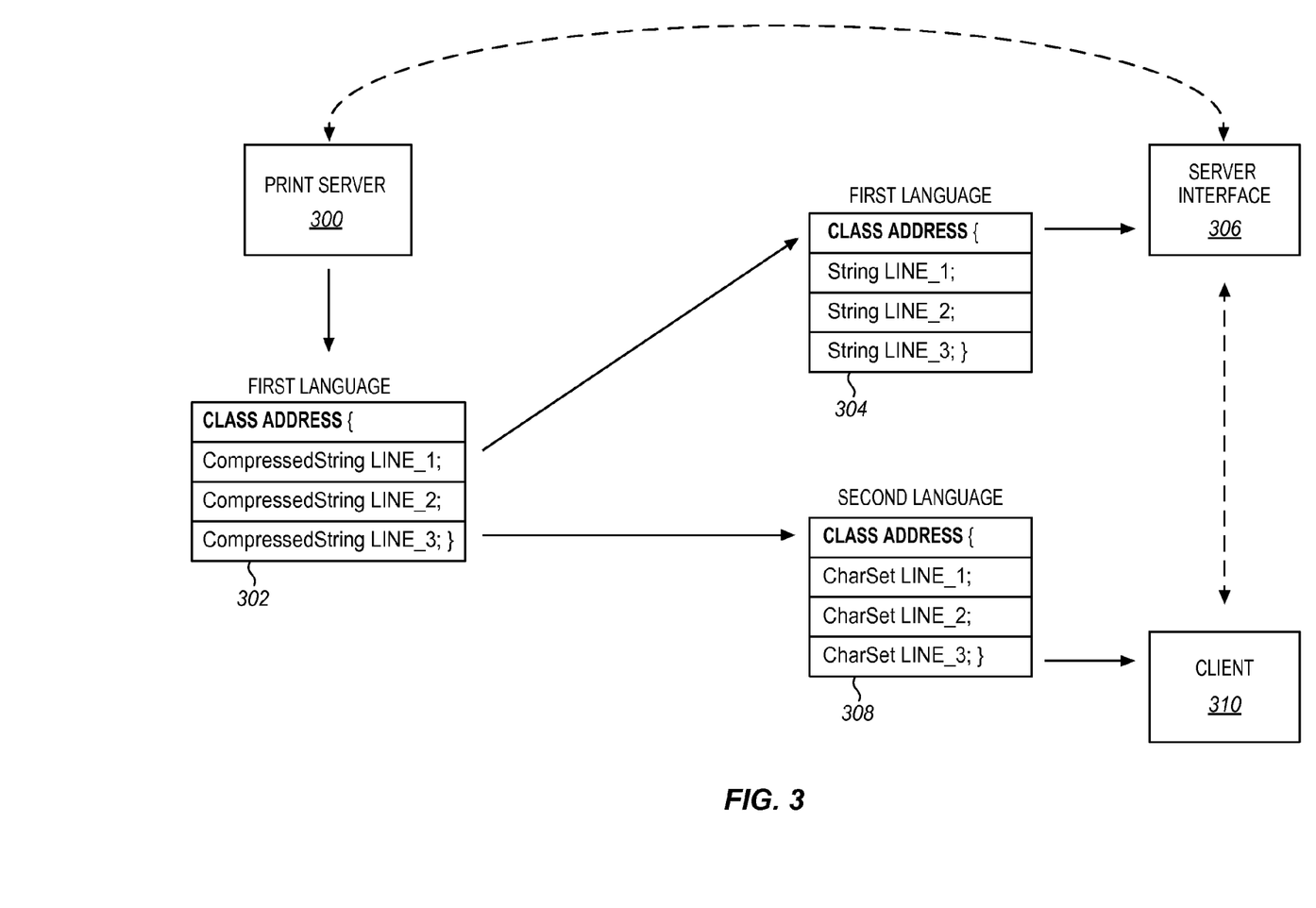
FIG. 3 illustrates the generation of source code for acquiring data from a data structure that is incompatible with a conversion library in an exemplary embodiment.

FIG. 3 illustrates the generation of source code for acquiring data from a data structure that is incompatible with a conversion library in an exemplary embodiment. According to FIG. 3, the solid arrows indicate interactions that are taken prior to run-time, while the dashed arrows indicate run-time operations of the various components. Code generator 150 reviews compiled source code for print server 300, implemented in Java, in order to acquire information defining the data structure. In this example, the data structure to be converted is class 302 (called "address"). Class 302 is used by print server 300 to store data describing a mailing address (for a print job) comprising three lines of text. Therefore, class 302 includes three separate elements, one for each line of the mailing address. Each of the elements (LINE_1, LINE_2, LINE_3) is implemented as a customized type called "CompressedString."

Unfortunately, the runtime conversion library that will be used with print server 300 does not support features for accessing class 302 because the elements of class 302 use a type (i.e., "CompressedString") that the conversion library does not recognize. Therefore, code generator 150 generates source code 304 in the language of print server 300 that may be compiled to generate a server interface 306 for accessing class 302. Source code 304 defines a revised data structure comprising three separate elements. Each element is of a type "String," and each element corresponds to one of the inaccessible elements of class 302. Additionally, each element of source code 304 has a name that associates it with a corresponding element of class 302. Source code 304 further includes functions for altering the CompressedString elements of class 302 whenever a String element of server interface 306 is altered at runtime (not shown).

In a similar fashion, code generator 150 creates source code 308 in a separate language than that of print server 300. Source code 308 may be compiled to generate client 310 for communicating with print server 300 via server interface 306. Source code 308 includes elements of the type "CharSet." The conversion library includes functions for converting elements of type CharSet to elements of type String. Additionally, source code 308 correlates the String elements of server interface 306 with the inaccessible CompressedString elements of class 302.

When the source code generated by code generator 150 is compiled, server interface 306 and client 310 are interoperable with each other. Specifically, client 310 may access the revised data structure implemented at server interface 306. Server interface 306 may then access a corresponding server-side data structure implementing class 302. Therefore, even though class 302 may not normally be accessed by the conversion library, it still may be manipulated by a client coded according to a different programming language.

Figure 4:
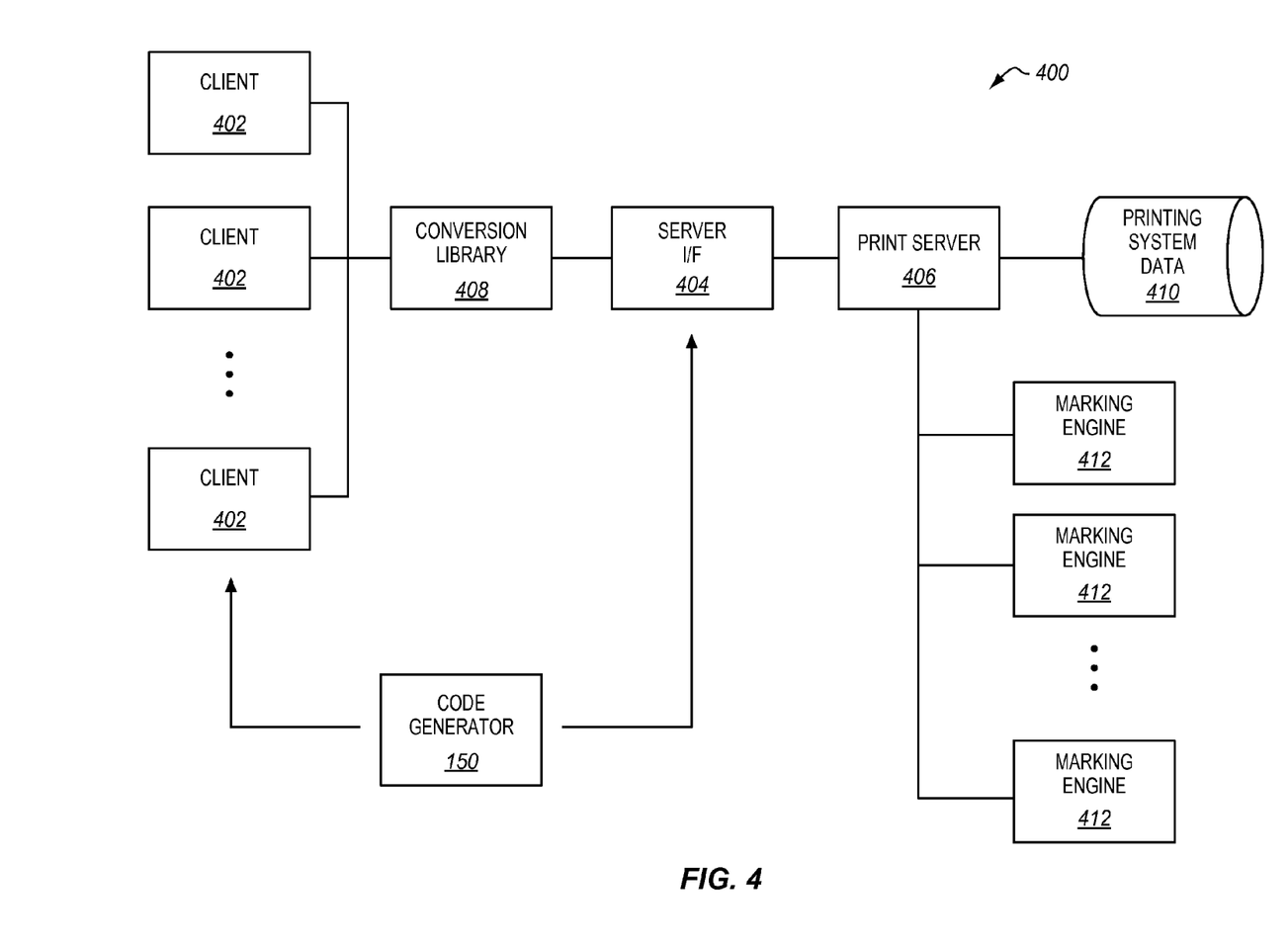
FIG. 4 is a block diagram of a printing system enabled by a code generator in an exemplary embodiment.

FIG. 4 is a block diagram of a printing system 400 enabled by a code generator 150 in an exemplary embodiment. Printing system 400 comprises any system operable to facilitate printing operations for one or more clients 402 via a server-side interface (I/F) 404 in communication with a print server 406. FIG. 4 is provided merely to illustrate an example of how clients and interfaces generated by code generator 150 may be used at runtime in an operating environment. Code generator 150 itself need not be implemented during the operation of printing system 400, as the role of code generator 150 is primarily to generate source code for components to be used at runtime. In this embodiment, printing system 400 comprises clients 402, server I/F 404, print server 406, conversion library 408, printing system data 410, and marking engines 412.

Clients 402 comprise any systems or components operable to communicate via server I/F 404 in order to acquire and modify information utilized by print server 406. For example, clients 402 may be used to alter user permissions, print jobs located at printing system data 410, printer settings for marking engines 412, etc. Clients 402 may be coupled with server I/F 404 via a networked connection, and may comprise personal computers, laptops, tablets, consoles residing at printers, etc. Clients 402 include customized code for manipulating data structures of server I/F 404 via conversion library 408. For example, clients 402 may be implemented in an Adobe® Flex® language, while server I/F 404 may be implemented in Java. Clients 402 may provide Adobe® Flex® commands to conversion library 408. The Adobe® Flex® commands are translated to Java commands by conversion library 408, and used to access server I/F 404.

Server I/F 404 comprises a server-side interface for receiving client communications. Server I/F 404 is coded according to the same language as print server 406 in order to enable server I/F 404 to access the internal data structures of print server 406. At the same time, server I/F 404 includes revised data structures that correspond to the internal data structures of print server 406 and may be accessed via conversion library 408.

Print server 406 comprises any system capable of managing the operations of printing system 400. For example, print server 406 may direct marking engines 412 to print jobs stored at printing system data 410, may queue incoming jobs for printing at different marking engines 412, etc.

Conversion library 408 comprises a runtime library capable of converting types from an application coded according to one language (e.g., an Adobe® Flex® language) and converting them to another language (e.g., Java). While conversion library 408 may convert a number of types from one language to another at runtime, it will be understood that conversion library 408 does not include the ability to convert all types in a given language to another given language. This is particularly true for types defining customized data formats implemented at print server 406. Typically, server I/F 404 will include a copy of conversion library 408 for use in translating incoming and outgoing commands. Alternatively, conversion library 408 may be used client-side to translate commands.

Printing system data 410 comprises any data utilized for managing the operations of printing system 400. For example, printing system data 410 may include data for user permissions, print jobs, printer settings, etc. Printing system data 410 may be implemented at a memory stored directly at print server 406, at marking engines 412, or at a location accessible to print server 406 via a networked communication channel.

Marking engines 412 comprise any systems, components, or devices operable to mark print data onto physical printing media. For example, marking engine 412 may utilize toner or ink to mark the print data onto printed pages. In one embodiment, marking engines 412 are high-speed marking engines designed for printing on continuous-form media.

Thus, printing system 400, while in operation, may be used to manage operations at a print shop. Furthermore, clients 402, enhanced by the method of FIG. 2, allow for enhanced levels of access to data stored at print server 406.

Figure 5:
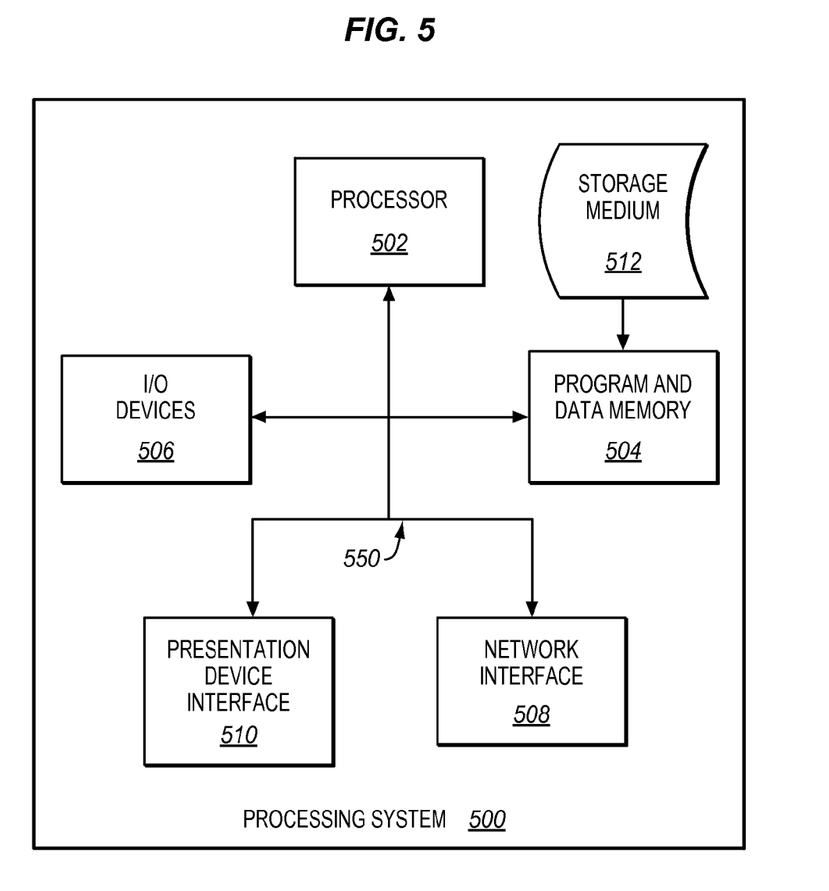
FIG. 5 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system for code generator 150 to perform the various operations disclosed herein. FIG. 5 illustrates a processing system 500 operable to execute a computer readable medium embodying programmed instructions to perform desired functions in an exemplary embodiment. Processing system 500 is operable to perform the above operations by executing programmed instructions tangibly embodied on computer readable storage medium 512. In this regard, embodiments of the invention can take the form of a computer program accessible via computer-readable medium 512 providing program code for use by a computer or any other instruction execution system. For the purposes of this description, computer readable storage medium 512 can be anything that can contain or store the program for use by the computer.

Computer readable storage medium 512 can be an electronic, magnetic, optical, electromagnetic, infrared, or semiconductor device. Examples of computer readable storage medium 512 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 500, being suitable for storing and/or executing the program code, includes at least one processor 502 coupled to program and data memory 504 through a system bus 550. Program and data memory 504 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 506 (including but not limited to keyboards, displays, pointing devices, etc.) can be coupled either directly or through intervening I/O controllers. Network adapter interfaces 508 may also be integrated with the system to enable processing system 500 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 510 may be integrated with the system to interface to one or more presentation devices, such as printing systems and displays for presentation of presentation data generated by processor 502.

Although specific embodiments were described herein, the scope of the invention is not limited to those specific embodiments. The scope of the invention is defined by the following claims and any equivalents thereof.

I claim:

1. A system for generating source code to enable communication between a server defined according to a first programming language and a client defined according to a second programming language, the system comprising:
a code generator, implemented by a processor, operable to identify a server data structure defined according to the first programming language, to determine types of the data structure that are not accessible via a runtime conversion library for communications between the server and the client, and to generate a revised data structure in the first programming language comprising types that are accessible via the runtime conversion library and that may be used to manipulate the inaccessible types;
the code generator further operable to generate source code in the second programming language for the client to access the revised data structure via the runtime conversion library, the source code correlating types of the revised data structure to the inaccessible types of the original data structure.

2. The system of claim 1 wherein:
the code generator is further operable to create types of the revised data structure by: recursively analyzing each inaccessible type to identify component types, determining component types supported for use with the conversion library, and including the determined component types at the revised data structure.

3. The system of claim 1 wherein:
the code generator is further operable to generate an interface for accessing the original data structure via the revised data structure, the interface comprising source code in the first programming language that implements the revised data structure and further correlates the accessible types of the revised data structure with the inaccessible types of the original data structure.

4. The system of claim 1 wherein:
the code generator is further operable to identify the original data structure by reviewing compiled source code for a server implementing the original data structure.

5. The system of claim 1 wherein:
the code generator is further operable to compile the source code to create the client for the server.

6. The system of claim 1 wherein:
the original data structure defines settings for printers of a printing system.

7. The system of claim 1 wherein:
the original data structure defines a format for print jobs.

8. The system of claim 1 wherein:
the original data structure defines permissions for user access to functions of a printing system.

9. A method for generating source code to enable communication between a server defined according to a first programming language and a client defined according to a second programming language, the method comprising:
identifying a server data structure defined according to the first programming language;
determining types of the data structure that are not accessible via a runtime conversion library for communications between the server and the client;
generating a revised data structure in the first programming language comprising types that are accessible via the runtime conversion library and that may be used to manipulate the inaccessible types; and
generating source code in the second programming language for the client to access the revised data structure via the runtime conversion library, the source code correlating types of the revised data structure to the inaccessible types of the original data structure.

10. The method of claim 9 further comprising:
creating types of the revised data structure by:
recursively analyzing each inaccessible type to identify component types;
determining component types that are supported for use with the conversion library; and
including the determined component types at the revised data structure.

11. The method of claim 9 further comprising:
generating an interface for accessing the original data structure via the revised data structure, the interface comprising source code in the first programming language that implements the revised data structure and further correlates the accessible types of the revised data structure with the inaccessible types of the original data structure.

12. The method of claim 9 wherein:
identifying the original data structure comprises reviewing compiled source code for a server implementing the original data structure.

13. The method of claim 9 further comprising:
compiling the source code to create the client for the server.

14. The method of claim 9 wherein:
the original data structure defines settings for printers of a printing system.

15. The method of claim 9 wherein:
The original data structure defines a format for print jobs.

16. The method of claim 9 wherein:
the original data structure defines permissions for user access to functions of a printing system.

17. A non-transitory computer readable medium embodying programmed instructions which, when executed by a processor, are operable for performing a method for generating source code to enable communication between a server defined according to a first programming language and a client defined according to a second programming language, the method comprising:
identifying a server data structure defined according to the first programming language;
determining types of the data structure that are not accessible via a runtime conversion library for communications between the server and the client;
generating a revised data structure in the first programming language comprising types that are accessible via the runtime conversion library and that may be used to manipulate the inaccessible types; and
generating source code in the second programming language for the client to access the revised data structure via the runtime conversion library, the source code correlating types of the revised data structure to the inaccessible types of the original data structure.

18. The medium of claim 17 further comprising:
creating the types of the revised data structure by:
recursively analyzing each inaccessible type to identify component types;
determining component types that supported for use with the conversion library; and
including the determined component types at the revised data structure.

19. The medium of claim 17 the method further comprising:
generating an interface for accessing the original data structure via the revised data structure, the interface comprising source code in the first programming language that implements the revised data structure and further correlates the accessible types of the revised data structure with the inaccessible types of the original data structure.

20. The medium of claim 17 wherein:
identifying the original data structure comprises reviewing compiled source code for a server implementing the original data structure.

* * * * *